United States Patent
Wakabayashi et al.

(10) Patent No.: US 9,479,619 B2
(45) Date of Patent: Oct. 25, 2016

(54) TRANSMISSION APPARATUS, TRANSMISSION SYSTEM, AND TRANSMISSION METHOD

(71) Applicant: FUJITSU LIMITED, Kawasaki-shi (JP)

(72) Inventors: Takanobu Wakabayashi, Utsunomiya (JP); Yasushi Tateno, Moka (JP); Dai Hagimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 206 days.

(21) Appl. No.: 14/314,717

(22) Filed: Jun. 25, 2014

(65) Prior Publication Data

US 2015/0016473 A1 Jan. 15, 2015

(30) Foreign Application Priority Data

Jul. 11, 2013 (JP) .................. 2013-145861

(51) Int. Cl.
*H04L 29/06* (2006.01)
*H04L 12/54* (2013.01)
*H04L 12/28* (2006.01)

(52) U.S. Cl.
CPC .............. *H04L 69/22* (2013.01); *H04L 12/28* (2013.01); *H04L 12/56* (2013.01); *H04L 29/06* (2013.01)

(58) Field of Classification Search
None
See application file for complete search history.

(56) References Cited

U.S. PATENT DOCUMENTS

| 2004/0170182 | A1 | 9/2004 | Higashida et al. |
| 2004/0252684 | A1* | 12/2004 | Evans ...................... H04L 49/30 370/389 |
| 2005/0135421 | A1* | 6/2005 | Chang ..................... H04L 12/40 370/474 |
| 2006/0153196 | A1* | 7/2006 | Diaz ................... H04L 12/5601 370/395.1 |
| 2007/0160012 | A1* | 7/2007 | Liu .......................... H04B 7/04 370/334 |
| 2009/0164627 | A1 | 6/2009 | Tateno |

FOREIGN PATENT DOCUMENTS

| JP | 5-268256 | 10/1993 |
| JP | 08-172485 | 7/1996 |
| WO | WO 03/017577 | 2/2003 |
| WO | 2009-153028 | 7/2009 |

* cited by examiner

*Primary Examiner* — Kodzovi Acolatse
(74) *Attorney, Agent, or Firm* — Staas & Halsey LLP

(57) ABSTRACT

An apparatus includes a transmission apparatus includes a memory, and a processor coupled to the memory and configured to extract a first data from control information used in communication processing with another transmission apparatus, the first data having a first data amount that is difference between data capacity of a first frame including second data and data amount of the second data, generate a second frame including the first data and the second data, and transmit the second frame to the another transmission apparatus.

12 Claims, 15 Drawing Sheets

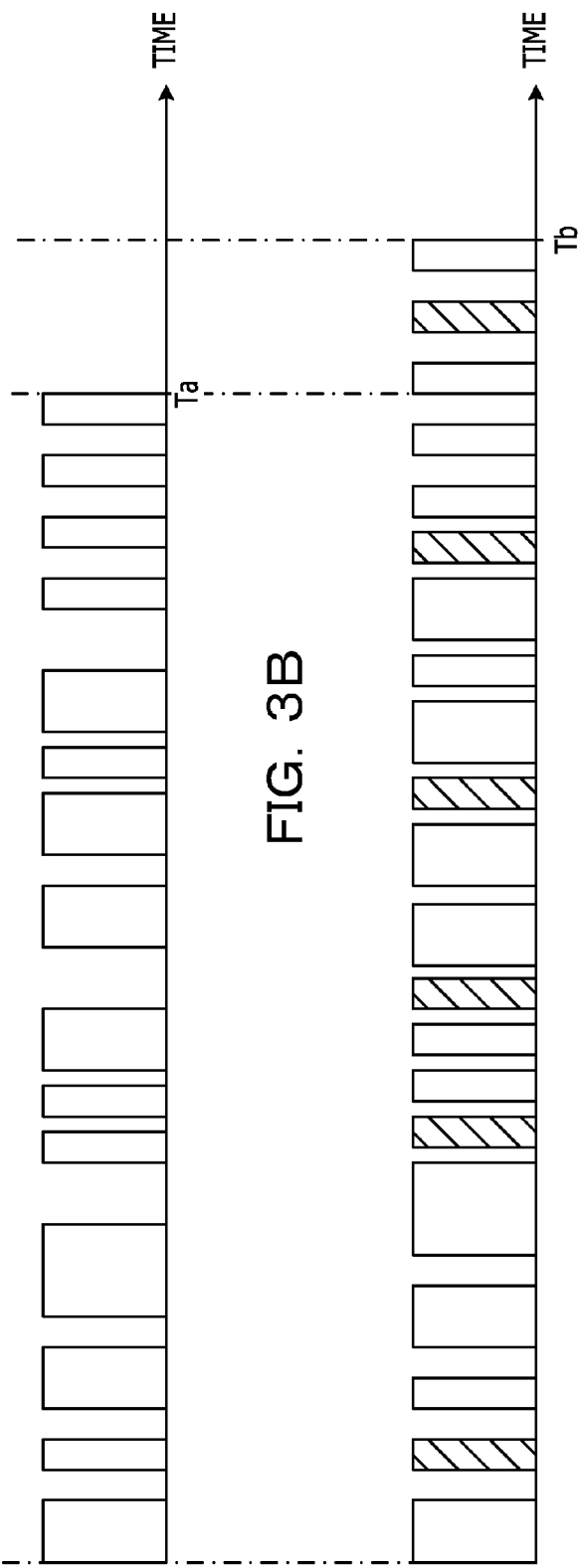

FIG. 9

| SFD CODE | | DATA SIZE (Byte) | TYPE |
|---|---|---|---|
| HEX | BIN | | |
| B0 | 1011 0000 | 0 | Configuration BPDU |
| B1 | 0001 | 1 | |
| B2 | 0010 | 2 | |
| B3 | 0011 | 3 | |
| B4 | 0100 | 0 | TCN BPDU |
| B5 | 0101 | 1 | |
| B6 | 0110 | 2 | |
| B7 | 0111 | 3 | |
| B8 | 1000 | 0 | CCM |
| B9 | 1001 | 1 | |
| BA | 1010 | 2 | |
| BB | 1011 | 3 | |
| BC | 1100 | 0 | APS |
| BD | 1101 | 1 | |
| BE | 1110 | 2 | |
| BF | 1111 | 3 | |

FIG. 12A

| BYTE COUNT | CONTENTS |
|---|---|
| 6 | DA(01-80-C1-00-00-00(h)) |
| 6 | SA |
| 2 | TYPE/LENGTH : 0x0026(BPDU=Configuration BPDU) or 0x0007(BPDU=TCN BPDU) |
| 3 | LLC Header(0x424203) |
| 35 or 4 | BPDU : Configuration BPDU(35(Byte)) or TCN BPDU(4(Byte)) |
| 8 or 39 | Padding Data |
| 4 | FCS |

FIG. 12B

| BYTE COUNT | CONTENTS |
|---|---|
| 2 | Protocol ID(0x0000) |
| 1 | Version(0x00) |
| 1 | Message Type(0x00) |
| 1 | Flags |
| 8 | Route ID |
| 4 | Path Cost |
| 8 | Bridge ID |
| 2 | Port ID |
| 2 | Message Age |
| 2 | Max Age |
| 2 | Hello Time |
| 2 | Forward Delay |

FIG. 12C

| BYTE COUNT | CONTENTS |
|---|---|
| 2 | Protocol ID(0x0000) |
| 1 | Version(0x00) |
| 1 | Message Type(0x80) |

FIG. 15A

| PARAMETER | DEFAULT VALUE | RANGE |
|---|---|---|
| Max Age | 20.0(SECONDS) | 6.0~40.0(SECONDS) |
| Forward Delay | 15.0(SECONDS) | 4.0~30.0(SECONDS) |

FIG. 15B

| STATE TRANSITION | DEFAULT VALUE | MINIMUM VALUE |
|---|---|---|
| Listening→(Forward Delay)→Learning→(Forward Delay)→Forwarding | 15×2=30 (SECONDS) | 4×2=8 (SECONDS) |
| Blocking→(Max Age)→Listening→(Forward Delay)→Learning→(Forward Delay)→Forwarding | 20+15×2=50 (SECONDS) | 6+4×2=14 (SECONDS) |

TRANSMISSION APPARATUS, TRANSMISSION SYSTEM, AND TRANSMISSION METHOD

CROSS-REFERENCE TO RELATED APPLICATION

This application is based upon and claims the benefit of priority of the prior Japanese Patent Application No. 2013-145861, filed on Jul. 11, 2013, the entire contents of which are incorporated herein by reference.

FIELD

The embodiment discussed herein is related to a transmission apparatus, a transmission system, and a transmission method.

BACKGROUND

As communication demands have been ever increasing, the high level communication protocols have been implemented by transmission apparatuses and control information transmitted and received between apparatuses has been increased. In a synchronous transmission network, such as a synchronous optical network (SONET)/synchronous digital hierarchy (SDH) network and the like, an overhead area that accommodates control information is provided in a frame. For example, a SONET/SDH frame has a hierarchy structure and areas that accommodate various types of control information (for example, K1, K2, C2, D4 bytes) are fixedly provided therein.

On the other hand, in Ethernet (registered trademark), which is an asynchronous transmission method, an area that accommodates such control information is not defined in an Ethernet frame in accordance with the specification. Therefore, in Ethernet, in addition to an Ethernet frame (which will be hereinafter referred to as a "user frame") that accommodates user data serving as a main signal, an Ethernet frame (which will be hereinafter referred to as a "control frame") that accommodates control information of communication protocols and the like is used.

Regarding packet transmission technology, such as Ethernet, for example, International Publication Pamphlet No. WO 2003/017577 describes that the transmission interval of a priority packet is reduced to be shorter than the generation interval thereof to thereby provide a margin period and a non-priority packet is transmitted in the margin period. Japanese Laid-open Patent Publication No. 5-268256 describes that, when an asynchronous transfer mode (ATM) cell has a margin area of 3 bytes or more, congestion information for an ATM exchanger is stored in the margin area. Japanese Laid-open Patent Publication No. 2009-153028 describes that a start frame delimiter (SFD) is extended to identify whether a network layer 2 frame is user data or maintenance management data.

Regarding SDH transmission technology, Japanese Laid-open Patent Publication No. 8-172485 describes that a first monitor pattern is inserted to a free time slot in a fixed location in section management information and a second monitor pattern is inserted in a free area in path management information.

SUMMARY

According to an aspect of the invention, an apparatus includes a transmission apparatus includes a memory, and a processor coupled to the memory and configured to extract a first data from control information used in communication processing with another transmission apparatus, the first data having a first data amount that is difference between data capacity of a first frame including second data and data amount of the second data, generate a second frame including the first data and the second data, and transmit the second frame to the another transmission apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A and 3B are diagrams illustrating examples of the band occupation state by Ethernet frames;

FIG. 9 is a table of SFD codes extended in accordance with the technique described in Japanese Laid-open Patent Publication No. 2009-153028;

FIGS. 12A, 12B, and 12C are tables illustrating examples of a control frame used in STP;

FIGS. 15A and 15B are tables illustrating parameters and the amount of time used for topology change of STP.

DESCRIPTION OF EMBODIMENT

A SONET/SDH frame is configured such that an area that accommodates control information is fixedly provided therein, and therefore, the control information is transmitted in a certain band at all the time. This is called in-band transmission. In contrast, in an Ethernet frame, such an area is not provided, and therefore, control information is accommodated in a control frame and is transmitted in a separate band from a band for a user frame. This is called out-band transmission.

Since applications of Ethernet not only to a local area network (LAN) but also to a wide area network (WAN), such as a trunk transmission network and the like, has been increasing, the level of inter-apparatus control processing, such as a communication protocol and the like, has become higher, and high speed transmission of control information is expected. However, there is a problem in which, when control information is transmitted at high speed, the band of the control frame is increased and thus the band of the user frame is pressed and reduced. That is, a problem of band efficiency arises.

Even if an accommodation area for control information is fixedly provided in an Ethernet frame, a problem of compatibility with existing transmission apparatuses arises since Ethernet has been widely used as a standard technology. Note that this is not only a problem limited to an Ethernet frame but also a problem of frames of some types which do not have an accommodation area for control information.

In view of the above described problem, the following embodiment has been devised to provide a transmission apparatus, a transmission system, and a transmission method which allow efficient transmission of control information.

Figure 1:
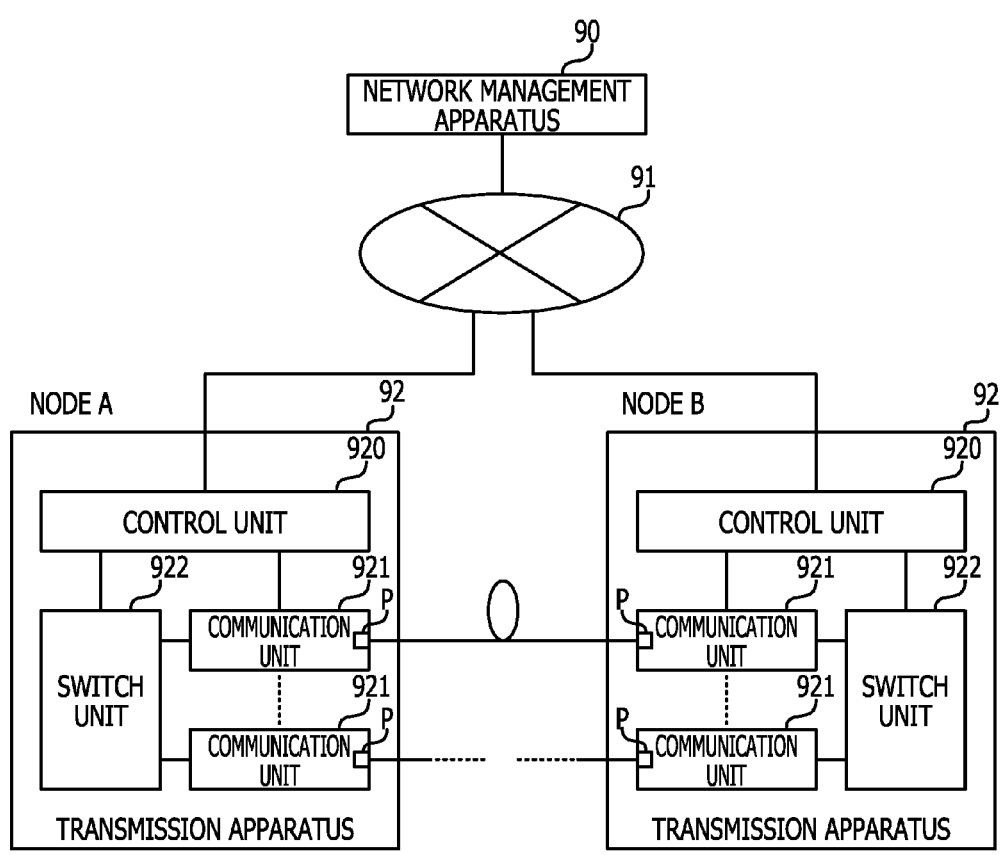
FIG. 1 is a configuration diagram illustrating a configuration of a transmission system according to an embodiment.

FIG. 1 is a configuration diagram illustrating a configuration of a transmission system according to an embodiment. The transmission system includes a network management apparatus 90 and transmission apparatuses 92 each of which is provided at the corresponding one of nodes A and B. In this embodiment, as the transmission apparatus 92, for example, a layer 2 switch configured to perform transfer processing of an Ethernet frame is used, but the transmission apparatus 92 is not limited thereto.

The transmission apparatus 92 includes a control unit 920, a plurality of communication units 921, and a switch unit 922. Note that, in this embodiment, the transmission apparatus 92 performs optical transmission, based on, for example, 1000BASE-LX, or the like, but transmission performed by the transmission apparatus 92 is not limited thereto and the transmission apparatus 92 may be configured to perform electric transmission, based on 1000BASE-T, or the like.

The control unit 920 controls the plurality of communication units 921 and the switch unit 922. The control unit 920 includes a processor, such as a central processing unit (CPU) and the like, and is driven by a software. The control unit 920 performs communication with the network management apparatus 90 to control the switch unit 922 and the communication units 921.

The communication units 921 perform communication with communication units of another transmission apparatus 92 via a transmission line, such as an optical fiber and the like. A port P is provided to the communication units 921 in order to couple to the transmission line.

The switch unit 922 exchanges Ethernet frames between the plurality of communication units 921. The switch unit 922 distributes an Ethernet frame to the communication unit 921 corresponding to a destination. The communication unit 921 outputs an Ethernet frame received via the transmission line to the switch unit 922 and transmits an Ethernet frame input from the switch unit 922 via the transmission line. Note that each of the control unit 920, the communication units 921, and the switch unit 922 is, for example, a circuit substrate on which a plurality of electric components are mounted, and is accommodated so as to be freely attachable and removable in the corresponding one of a plurality of slots provided in a case (having, for example, a rack shape) of the corresponding transmission apparatus 92.

The network management apparatus 90 is coupled to the transmission apparatus 92 of each node via, for example, a LAN 91. The network management apparatus 90 manages each transmission apparatus 92 and performs, for example, various types of setting processing.

Figure 2A:
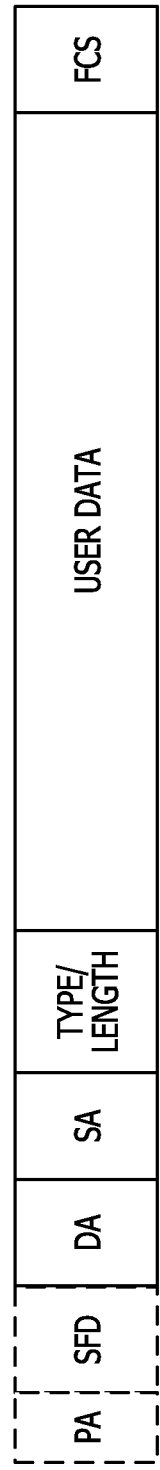
FIGS. 2A and 2B are configuration diagrams illustrating configurations of Ethernet frames.
Figure 2B:
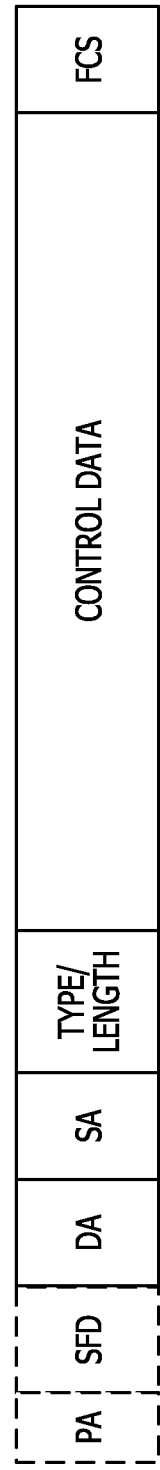

FIGS. 2A and 2B are configuration diagrams illustrating configurations of Ethernet frames. In this embodiment, as the Ethernet frames, there are a user frame and a control frame.

The user frame includes a destination address (DA), a source address (SA), TYPE/LENGTH, user data, and a frame check sequence (FCS). A preamble (PA) and SFD are used for detecting an Ethernet frame. DA and SA represent a destination and a transmission source, respectively. TYPE/LENGTH represents a protocol type or the length of a frame.

The user data is data of a main signal transmitted from a network or a terminal device of a user, or the like. FCS is an error correction code used for correcting a data error which occurs in a part from DA to the user data.

On the other hand, the control frame accommodates control data, instead of the user data. The control data is used for control processing (for example, protocol processing) between the transmission apparatuses 92. As described above, since the Ethernet frame does not have an area in which control data is stored in accordance with the definition, a separate frame from the user frame is thus used as the control frame. Note that, in this embodiment, the control data herein is payload data of the control frame and, as will be described below, is described in distinction from control information added to data in the user frame or the control frame.

FIGS. 3A and 3B illustrate examples of the band occupation state by Ethernet frames. The state of a band when only the user frame is transmitted and the state of the band when the user frame and the control frame are transmitted are illustrated in FIGS. 3A and 3B, respectively. In this case, the abscissa represents time.

As the state of the band when only the user frame is transmitted and the state of the band when the user frame and the control frame are transmitted are compared with each other, unlike SONET/SDH, the control frame is transmitted by out band transmission, and therefore, the band of the control frame presses the band of the user frame to thereby reduce it. Thus, the amount of time used for transmitting the user frame is increased from Ta to Tb (Tb>Ta).

Figure 4:
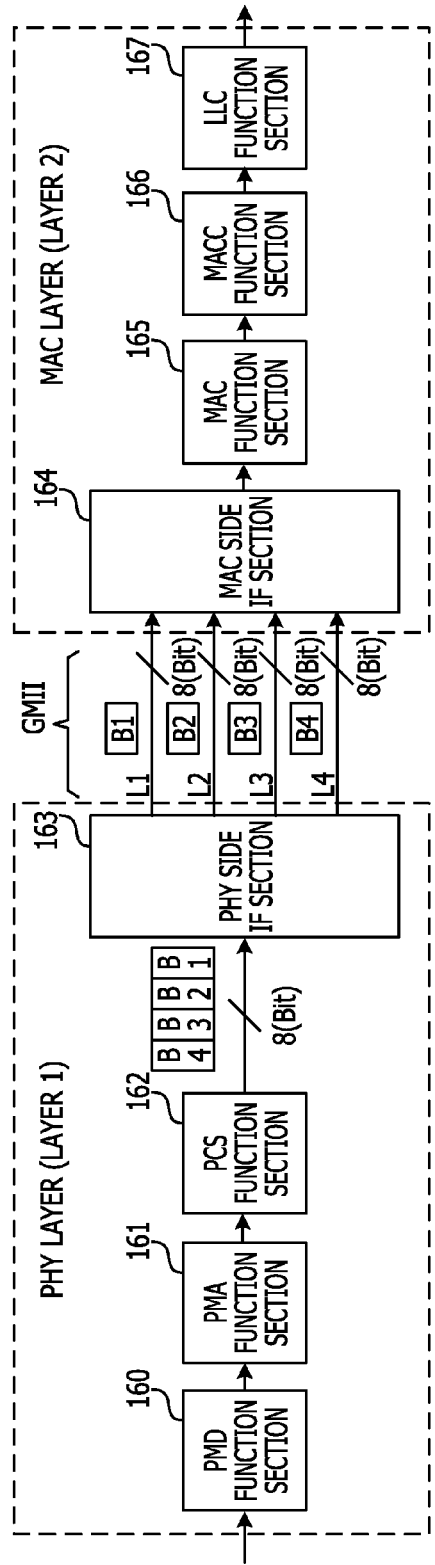
FIG. 4 is a configuration diagram illustrating configurations of a physical (PHY) layer and a media access control (MAC) layer.

Next, transmission processing for an Ethernet frame defined by the Institute of Electrical and Electronics Engineers, Inc. (IEEE) 802.3 will be described. FIG. 4 is a configuration diagram illustrating the configurations of a PHY layer and a MAC layer. Note that FIG. 4 illustrates the configuration of the Ethernet frame of the reception side, but the configuration of the Ethernet frame of the transmission side is similar to the configuration of the reception side, except that data moves in the opposite direction.

In the PHY layer (LAYER 1), processing of each of a physical medium dependent (PMD) function section 160, a physical medium attachment (PMA) function section 161, and a physical coding sub-layer (PCS) function section 162 is performed. Each of the function sections 160-162 has a function in accordance with a sub-layer defined in the PHY layer in IEEE 802.3.

A PHY side interface (IF) section 163 is provided at an interface with the MAC layer (LAYER 2). Every 8 bits of the Ethernet frame is input as 10 bit serial stream data to the PMD function section 160.

The PCS function section 162 converts 10 bit serial stream data to each of 8 bit parallel data pieces B1-B4. In this case, each of the data pieces B1-B4 is 8 bit data. The PHY side IF section 163 distributes the data pieces B1-B4 to four lanes L1-L4, respectively. That is, 1 byte is distributed to 1 lane and is thus output to the MAC layer. In the case of 1000 BASE-LX, or the like, the interface of the PHY layer and the MAC layer is called gigabit media independent interface (GMII).

The MAC layer performs processing of each of a MAC side interface (IF) section 164, a MAC function section 165, a MAC control (MACC) function section 166, and a logical link control (LLC) function section 167. Each of the function sections 166 and 167 has a function corresponding to a sub-layer defined in the MAC layer in IEEE 802.3. In the MAC layer, the parallel data pieces B1-B4 distributed to the lanes L1-L4, respectively, are processed in parallel. That is, in the MAC layer, data of 32 bits is processed in parallel. Thus, in the MAC layer, the frequency of a clock signal used for transmission processing is ¼ of that in the PHY layer.

As described above, the Ethernet frame is transmission-processed in parallel in a unit (sub-frame) of 32 bits, that is, a unit of 4 bytes. Therefore, when the length of the Ethernet frame is not an integral multiple of 4 bytes of the processing unit of transmission processing, that is, the number of the lanes L1-L4, an excess of a transmission processing amount is generated.

Figure 5:
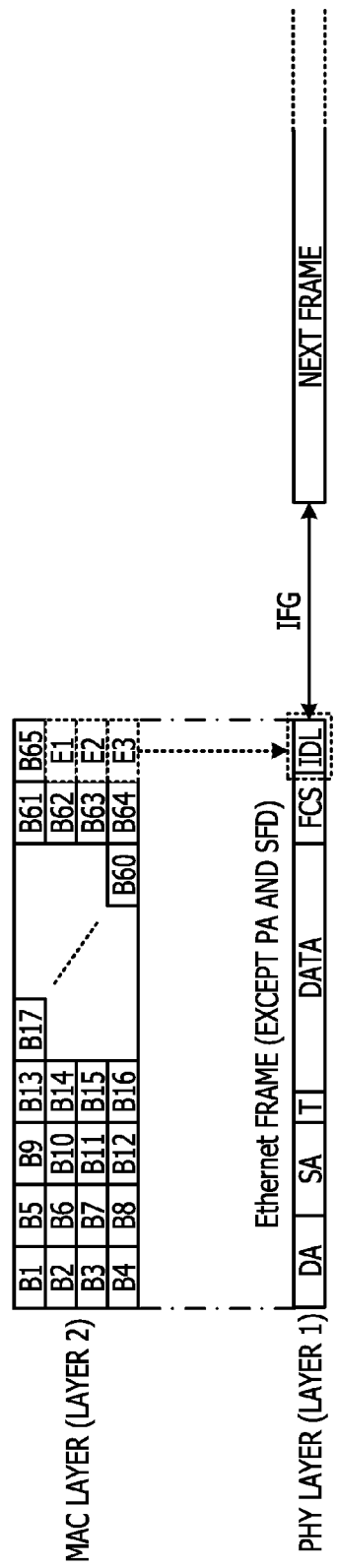
FIG. 5 is a diagram illustrating a transmission method according to a comparative example.

FIG. 5 illustrates a transmission method according to a comparative example. More specifically, FIG. 5 illustrates transmission processing for an Ethernet frame having a length of 65 byte.

As described above, in the MAC layer, the data pieces B1-B65 of the Ethernet frame is transmission-processed in parallel in a unit of 4 bytes. In this case, the data amount of each of the data pieces B1-B65 is 1 byte.

The length (65 bytes) of the Ethernet frame is not an integral multiple of 4 bytes of the processing unit of transmission processing, and therefore, an excess E1-E3 of the transmission processing amount, which corresponds to 3 bytes in terms of data size, is generated. In the PHY layer, the data pieces B1-B65 transmitted from the MAC layer is serial-converted and is thus transmitted. In this case, the Ethernet frame of the PHY layer is represented in formats illustrated in FIG. 2A and FIG. 2B. Note that "T" represents "TYPE/LENGTH" of FIG. 2A and FIG. 2B.

In the PHY layer, an idle code IDL of a predetermined pattern is inserted with timings corresponding to the above-described excess E1-E3 so that parallel transmission processing is performed in a unit of 4 bytes also at the reception side. The idle code IDL is located in a location immediately after FCS at the end of the Ethernet frame, that is, immediately before an inter frame gap (IFG) which is a gap between the frame and the next frame. IFG is formed by an idle pattern similar to the idle code IDL, and therefore, the gap between Ethernet frames is substantially increased by the idle code IDL and band efficiency is reduced.

In the embodiment, instead of the idle code IDL, control information is accommodated in an Ethernet frame, thereby effectively utilizing a band.

Figure 6:
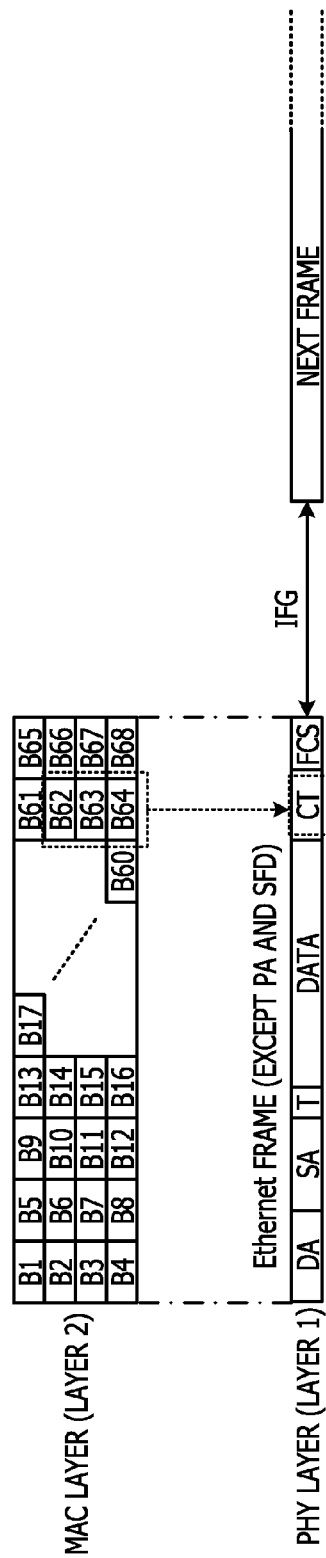
FIG. 6 is a diagram illustrating a transmission method according to an embodiment.

FIG. 6 illustrates a transmission method according to the embodiment. In the embodiment, data accommodated in the Ethernet frame is transmission-processed in parallel in a unit of a predetermined amount, and control information CT is added to data in accordance with an excess of the transmission processing amount generated when the length of the frame is not an integral multiple of the predetermined amount, thereby efficiently transmitting control information.

As illustrated in FIG. 5, when the length of the frame is 65 bytes, the excess E1-E3 of the transmission processing amount corresponds to 3 bytes. Thus, as the control information CT, data pieces B62-B64 corresponding to 3 bytes are added (68 bytes=4 bytes×17) so that the length (65 byte) of the Ethernet frame is an integral multiple of the processing unit (4 bytes) of transmission processing. That is, the length of the frame is extended in accordance with the excess of the transmission processing amount.

The control information CT is data substantially used for control processing with another transmission apparatus, among control data included in the control frame. The control information CT is inserted in a location immediately before FCS located at the end of the Ethernet frame. Thus, in the control information CT, a data error is corrected by FCS.

As described above, the control information CT is added in accordance with an excess of the transmission processing amount, and thus, utilizing a free area generated by the excess, the control information CT can be transmitted without affecting the band of the user frame. In contrast, the technology described in Japanese Laid-open Patent Publication No. 5-268256 uses an ATM cell having a fixed length (53 bytes), and therefore, unlike this embodiment, an excess of the transmission processing amount is not generated in accordance with the length of a frame.

Note that, in the example of FIG. 6, the control information CT having a data size corresponding to an excess of the transmission processing amount is added so that the length of the frame is an integral multiple of the processing unit of transmission processing, but the data size of the control information CT that is to be added is not limited thereto. The data size of the control information CT that is to be added may be smaller than the data size corresponding to an excess of the transmission processing amount. That is, in this example, the data size of the control information CT may be 1 byte or 2 bytes.

Figure 7:
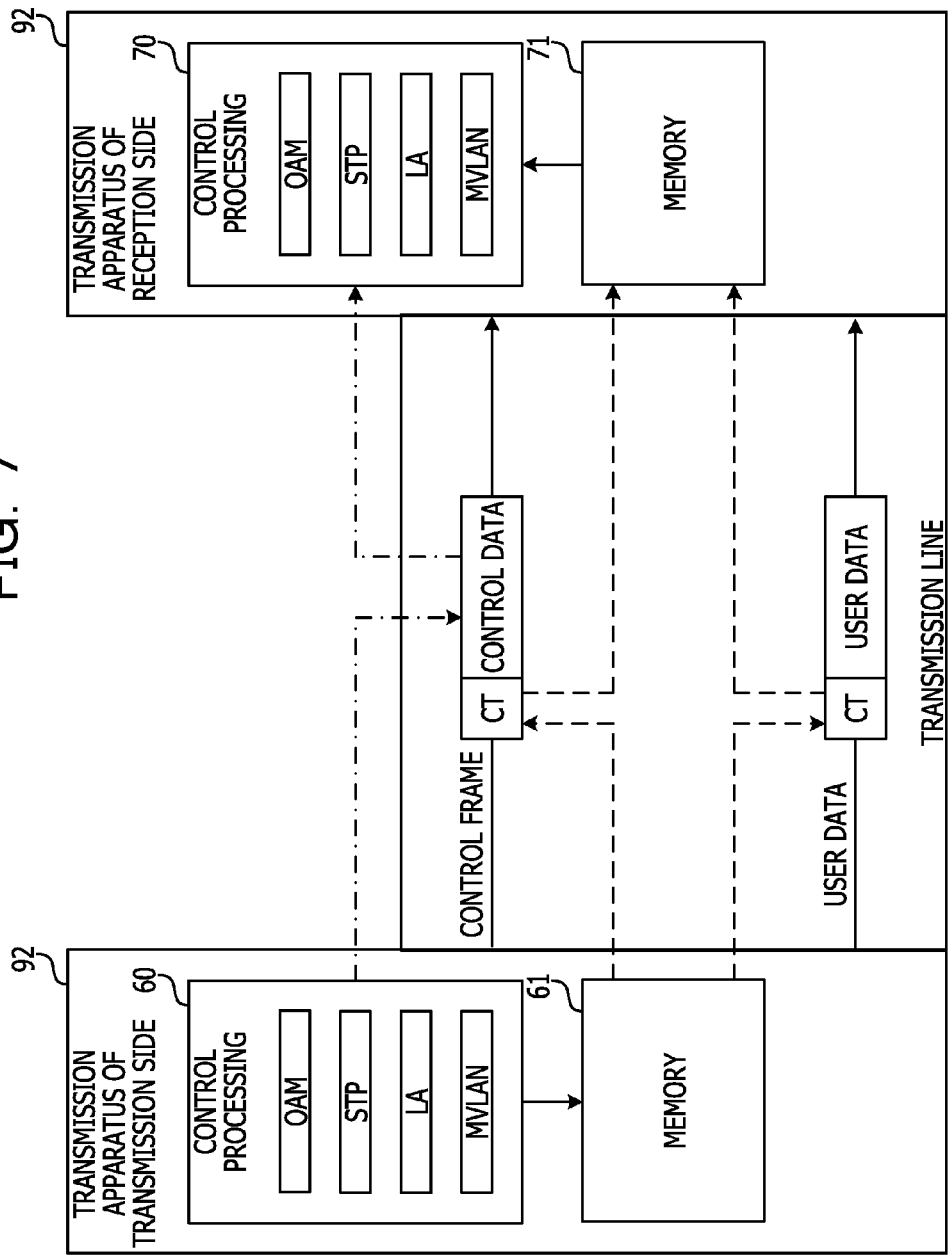
FIG. 7 is a diagram illustrating a data transmission method performed in control processing between transmission apparatuses.

FIG. 7 illustrates a data transmission method performed in control processing between the transmission apparatuses 92. The transmission apparatus 92 of the transmission side and the transmission apparatus 92 of the reception side execute control processing 60 and control processing 70 of, for example, operation administration and maintenance (OAM), a spanning tree protocol (STP), link aggregation (LA), and a multicast virtual LAN (MVLAN). The control processing 60 and the control processing 70 are referred to as Layer 2 Control Plane (L2CP) or the like.

In the transmission apparatus 92 of the transmission side, control data of the control processing 60 is transmitted by the control frame and is used for the control processing 70 of the transmission apparatus 92 of the reception side (see the alternate long and short dash line). In the transmission apparatus 92 of the transmission side, at least a part of the control data is stored in a memory 61, is accommodated as the control information CT in the user frame or the control frame, and is thus transmitted. Note that the user frame and the control frame are transmitted via the same transmission line. The control information CT is stored in a memory 71 of the transmission apparatus 92, and thereafter, is used for the control processing 70 (see the dashed line). Normally, there are more bands of the user frames than the bands of control frames, and therefore, the control information CT is transmitted in a communication form without band guarantee before the control data. Therefore, the data transmission speed in the control processing between the transmission apparatuses 92 is increased, and thus, the speed of control processing is increased. Note that this advantage will be described later with reference to STP as an example.

Figure 8:
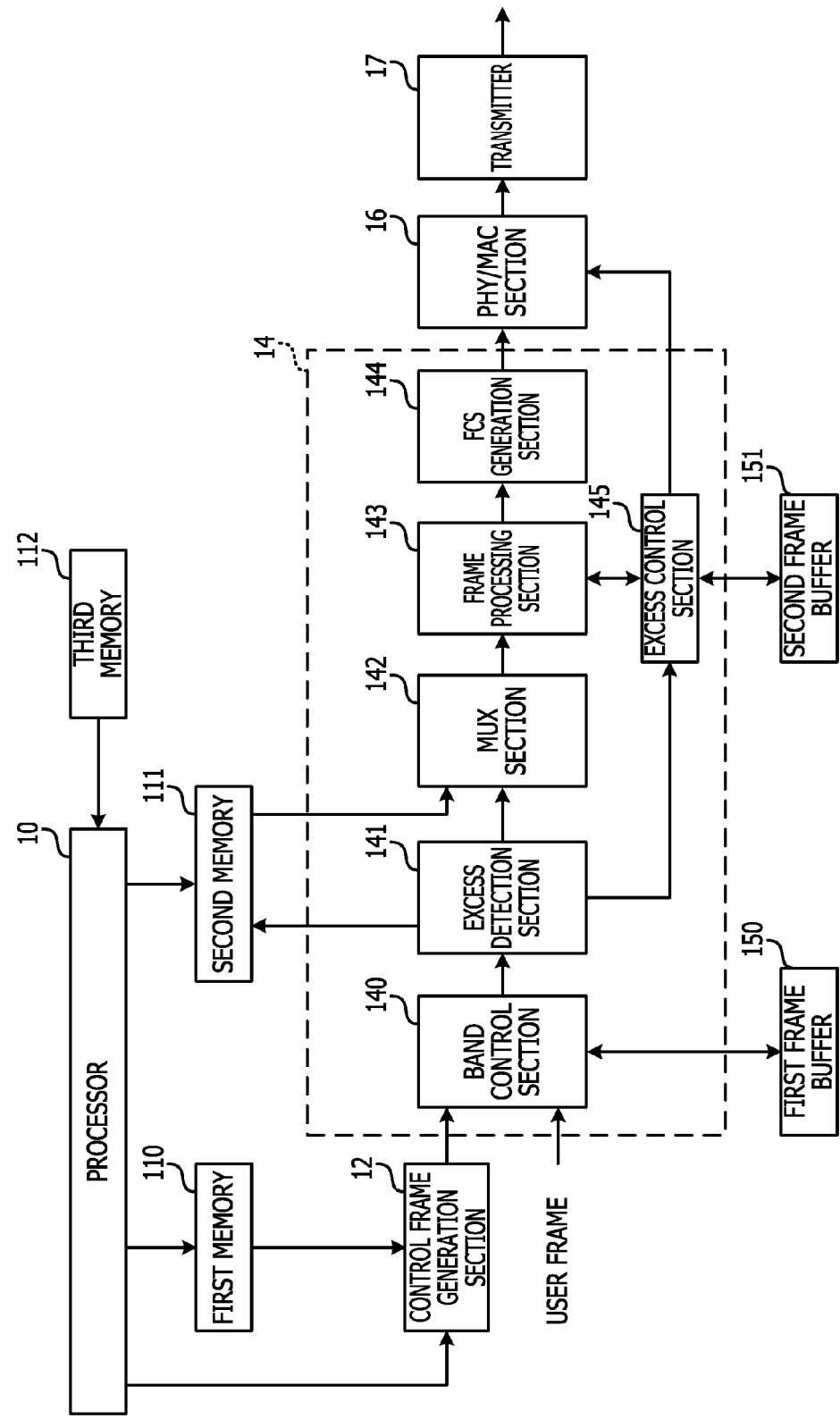
FIG. 8 is a configuration diagram illustrating a functional structure of the transmission side of a communication unit.

FIG. 8 is a configuration diagram illustrating the functional structure of the transmission side of the communication unit 921. The communication unit 921 includes a processor 10, first, second, and third memories 110-112, a control frame generation section 12, and a traffic control section 14. The communication unit 921 further includes a first frame buffer 150, a second frame buffer 151, a PHY/MAC section 16, and a transmitter 17.

The processor 10 is, for example, a CPU, and executes the above-described control processing. The processor 10 is coupled to the first, second, and third memories 110-112 via a data bus.

The third memory 112 is a nonvolatile memory, such as a flash memory and the like, and stores a program that drives the processor 10. The processor 10 reads the program from the third memory 112 to operate at a start-up of the communication unit 921.

The first memory 110 is a storage section, such as, for example, a random access memory (RAM), and stores frame data constituting a control frame. The processor 10 generates frame data and writes the generated frame data to the first memory 110.

The second memory 111 is a storage section, such as, for example, a RAM, and stores control information. The processor 10 generates control information and writes the generated control information to the second memory 111. The control information is data substantially used for control, among control data accommodated in the control frame. For example, in STP, which will be described later, control information serves as a bridge protocol data unit (BPDU) (see FIGS. 12A, 12B, and 12C).

When a control signal is input to the control frame generation section 12 from the processor 10, the control frame generation section 12 reads out frame information from the first memory 110 to generate a control frame. The control frame is output to the traffic control section 14.

The traffic control section 14 is, for example, a network processor and includes a band control section 140, an excess detection section 141, a MUX section 142, a frame processing section 143, an FCS generation section 144, and an excess control section 145.

The band control section 140 writes a user frame input thereto from the switch unit 922 and a control frame input thereto from the control frame generation section 12 to the first frame buffer 150. The band control section 140 has, for example, a shaper function, and outputs the user frame or the control frame to the excess detection section 141 so that predetermined quality of service (QoS) is satisfied.

The excess detection section 141 detects an excess of the transmission processing amount generated when the length of the user frame and the control frame is not an integral multiple of the processing unit of transmission processing performed in the PHY/MAC section 16. An Ethernet frame is transmission-processed in parallel in a unit of 4 bytes in the manner described with reference to FIG. 4, and thus, the excess of the transmission processing amount is 0 byte-3 bytes. Referring to an example illustrated in FIG. 6, the length of the frame is 65 bytes, and thus, the excess detection section 141 detects 3 bytes as the excess of transmission processing. As another example, when the length of the frame is 66 bytes, the excess detection section 141 detects 2 bytes as the excess of transmission processing.

The excess detection section 141 detects the excess of transmission processing by, for example, dividing the length of the frame by the processing unit of transmission processing to obtain an excess and subtracting the excess from the processing unit. That is, the excess detection section 141 detects the excess of transmission processing by performing the following calculation difference value between processing unit and excess obtained by dividing the length of frame by processing unit.

In the example of FIG. 6, since the number of lanes is four, the processing unit is 4 bytes and the length of the frame is 65 bytes. The excess detection section 141 notifies the excess control section 145 of the detected excess.

The excess detection section 141 requests the second memory 111 for control information having a data size corresponding to the detected excess. The control information having the data size in accordance with the request is read out from the second memory 111 and is input to the MUX section 142.

The MUX section (an addition processing section) 142 adds the control information read out from the second memory 111 to a user frame or a control frame input from the excess detection section 141. Referring to the example of FIG. 6, 3 bytes data pieces B62-B64 are added as the control information.

As described above, the MUX section 142 adds control information to data accommodated in an Ethernet frame in accordance with an access detected by the excess detection section 141. Therefore, an excess of transmission processing generated in the PHY/MAC section 16 of the subsequent stage can be detected before transmission processing, and control information can be transmitted by utilizing the excess.

More specifically, the MUX section 142 adds control information of a data size corresponding to an excess such that the length of the Ethernet frame is an integral multiple of the processing unit. Thus, control information can be transmitted, utilizing the excess of transmission processing without wasting it.

The MUX section 142 outputs the user frame and the control frame to the frame processing section 143. The frame processing section 143 removes internal headers given to the user frame and the control frame in the communication unit. Note that the internal headers are data areas including destination information of the user frame and the like.

The excess control section 145 determines an SFD code (which will be hereinafter referred to as an "SFD") extended in accordance with what is described in Japanese Laid-open Patent Publication No. 2009-153028, based on the data size corresponding to the excess notified of from the excess detection section 141. The SFD code is a value of SFD illustrated in FIG. 2A and FIG. 2B.

FIG. 9 is a table of SFD codes extended in accordance with what is described in Japanese Laid-open Patent Publication No. 2009-153028. The SFD code is described in hexadecimal presentation (see "HEX") and binary presentation (see "BIN").

The SFD code includes size information (see "DATA SIZE") indicating the data size of control information and type information (see "TYPE") indicating the type of the control information. As illustrated in the example of FIG. 6, when the processing unit is 4 bytes, the size information indicates a value of 0-3 bytes. Examples of the type information include "Configuration BPDU" and "Topology Change Notification (TCN) BPDU" of STP, "Continuity Check Message (CCM)" and "Automation Protection Switching (APS)" of Ethernet linear protection, and the like. Note that Ethernet linear protection is defined in International Telecommunication Union Telecommunication Standardization Sector (ITU-T) recommendation G.8031.

For example, when the control information is 3 byte data of "TCN BPDU", the SFD code is B7 (h). When the control information is 2 byte data of "Configuration BPDU", the SFD code is B2 (h). In this case, the type information is determined by provisioning setting of, for example, the processor 10.

The excess control section 145 writes the determined SFD code with the corresponding user frame or the corresponding control frame to the second frame buffer 151. In response to a request received from the PHY/MAC section 16, the excess control section 145 reads out the user frame or the control frame and the SFD code from the second frame buffer 151. The SFD code is output to the PHY/MAC section 16 and the user frame or the control frame is output to the FCS generation section 144 via the frame processing section 143.

The FCS generation section 144 calculates the frame data to generate FCS and inserts the generated FCS in the user frame or the control frame. After control information is added to the user frame or the control frame by the MUX section 142, the FCS generation section 144 generates FCS. That is, the FCS generation section 144 is disposed in the subsequent stage of the MUX section 142.

If the FCS generation section 144 is disposed in the preceding stage, FCS is generated again after the control information is added to the user frame or the control frame. Therefore, the FCS generation section 144 is disposed in the subsequent stage of the MUX section 142, thus allowing the calculation of the FCS to be completed at one time and thus reducing the circuit size.

The PHY/MAC section 16 transmission-processes data accommodated in the Ethernet frame in a predetermined unit (the processing unit). For example, as described with reference to FIG. 4, the PHY/MAC section 16 performs transmission processing in parallel in a unit of 4 bytes. Moreover, the PHY/MAC section 16 generates SFD in accordance with the SFD code notified of from the excess control section 145 and adds the generated SFD to the head of the Ethernet frame.

The transmitter 17 is, for example, small form-factor pluggable (SFP) or 10(X) gigabit small form-factor pluggable (XFP), and converts an electrical signal of the Ethernet frame into an optical signal and transmits the optical signal to the transmission line.

Figure 10:
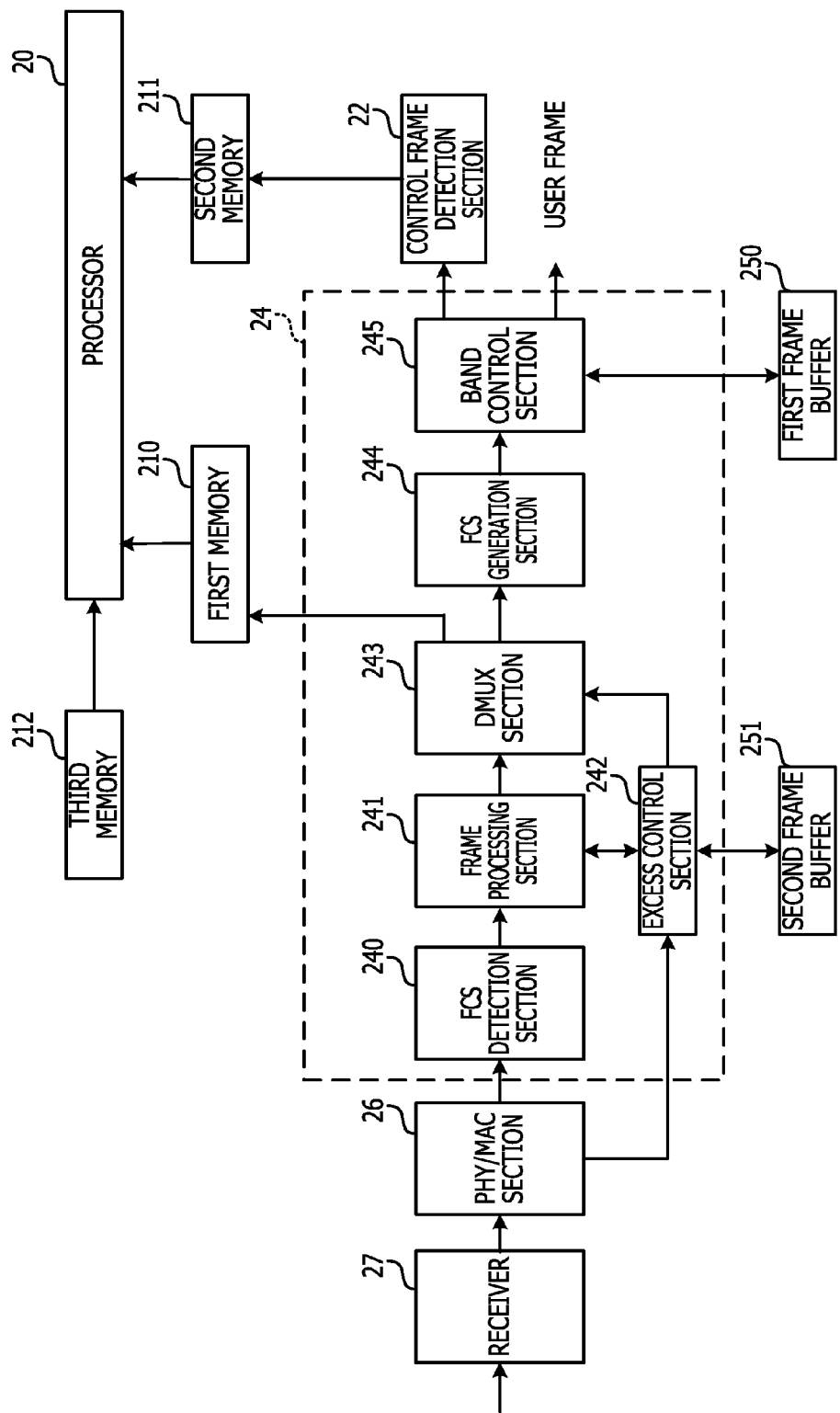
FIG. 10 is a configuration diagram illustrating a functional structure of the reception side of a communication unit.

FIG. 10 is a configuration diagram illustrating a functional structure of the reception side of the communication unit 921. The communication unit 921 includes a processor 20, first, second, and third memories 210-212, a control frame detection section 22, a traffic control section 24, a first frame buffer 250, a second frame buffer 251, a PHY/MAC section 26, and a receiver 27.

The receiver 27 is, for example, SFP or XFP, and converts an optical signal of the Ethernet frame received from the transmission line into an electrical signal and outputs the electrical signal to the PHY/MAC section 26.

The PHY/MAC section 26 transmission-processes data accommodated in the Ethernet frame in a predetermined unit. As described with reference to FIG. 4, the PHY/MAC section 26 performs transmission processing in parallel in a unit of 4 bytes. Moreover, the PHY/MAC section 26 extracts the size information from SFD of the received frame and outputs the size information to the traffic control section 24. Note that the type information included in SFD is used for provisioning setting of the processor 20.

The PHY/MAC section 26 outputs the user frame and the control frame to the traffic control section 24. The traffic control section 24 includes an FCS check section 240, a frame processing section 241, an excess control section 242, a DMUX section 243, an FCS generation section 244, and a band control section 245.

The FCS check section 240 checks, based on FCS, the user frame and the control frame input from the PHY/MAC section 26. On detecting a data error, the FCS check section 240 corrects the data error, based on FCS.

The frame processing section 241 writes the user frame and the control frame input from the FCS check section 240 to the second frame buffer 251 via the excess control section 242. The excess control section 242 is notified of the size information by the PHY/MAC section 26. The excess control section 242 adds an ID to the size information and thereby writes the size information to the second frame buffer 251 in association with the corresponding user frame or the control frame.

The frame processing section 241 adds the internal header to the user frame or the control frame read out from the second frame buffer 251 and outputs the read-out frame to the DMUX section 243. In this adding and outputting, the excess control section 242 retrieves, based on the ID, the size information corresponding to the user frame or the control frame to read out the user frame or the control frame from the second frame buffer 251 and outputs the read-out frame to the DMUX section 243.

The DMUX section (an information obtaining section) 243 obtains, based on the size information, control information from the user frame or the control frame, and writes the obtained control information to the first memory 210. The first memory 210 is, for example, a storage section, such as a RAM and the like, and stores the control information. For example, when the accumulation amount is the data size corresponding to a single control frame, the control information stored in the first memory 210 is read out by the processor 20.

The processor 20 is, for example, a CPU, and executes the above-described control processing. The processor 20 is coupled to the first, second, and third memories 210-212 via a data bus.

The third memory 212 is a nonvolatile memory, such as a flash memory and the like, and stores a program that drives the processor 20. The processor 20 reads the program from the third memory 212 to operate at a start-up of the communication units 921.

The FCS generation section 244 receives, as an input, the user frame or the control frame from which the control information has been removed from the DMUX section 243. The FCS generation section 244 regenerates FCS and inserts the regenerated FCS in the user frame or the control frame.

The band control section 245 writes the use frame or the control frame input from the FCS generation section 244 to the first frame buffer 250. The band control section 245 has, for example, the policer function, and outputs the control frame to the control frame detection section 22 and the user frame to the switch unit 922 such that predetermined quality of Service (QoS) is satisfied. Note that the band control section 245 distinguishes, for example, based on the content of DA, the user frame and the control frame.

The control frame detection section 22 detects the control frame and writes the detected control frame to the second memory 211. The second memory 211 is a storage section, such as, for example, a RAM and the like, and stores the control frame.

The processor 20 reads out the control frame from the second memory 211. In this reading, the processor 20 also reads out the control information from the first memory 210, and therefore, performs priority control for the control information of the first memory 210 and the control frame of the second memory 211.

As a priority control method, for example, a method in which one of the control information of the first memory 210 and the control frame of the second memory 211 which reaches the corresponding one of the first memory 210 and the second memory 211 first is processed in prior to the other is used. In this case, normally, the control information of the first memory 210 reaches the first memory 210 first, and therefore, the control frame of the second memory 211 is discarded by the processor 20.

More specifically, the processor 20 keeps the control frame processed last stored in the third memory 212 and compares it with the content of the control information which has reached the corresponding first memory 210 first. As a result of the comparison, if the control frame matches the control information, the processor 20 discards the control frame and, if the control frame does not match the control information, the processor 20 performs processing of confirming consecutive matching of three frames and then executes, based on the control frame, control processing.

The transmission method illustrated in FIG. 5 is enabled by providing the configurations illustrated in FIG. 8 and FIG. 10 in the transmission apparatus (a first transmission apparatus) 92 that transmits an Ethernet frame and the transmission apparatus (a second transmission apparatus) 92 that receives the Ethernet frame, respectively. Thus, the network management apparatus 90 illustrated in FIG. 1 performs setting processing on the transmission apparatuses 92 of the transmission side and the reception side in accordance with whether or not the above-described configurations are provided to the transmission apparatuses 92.

Figure 11:
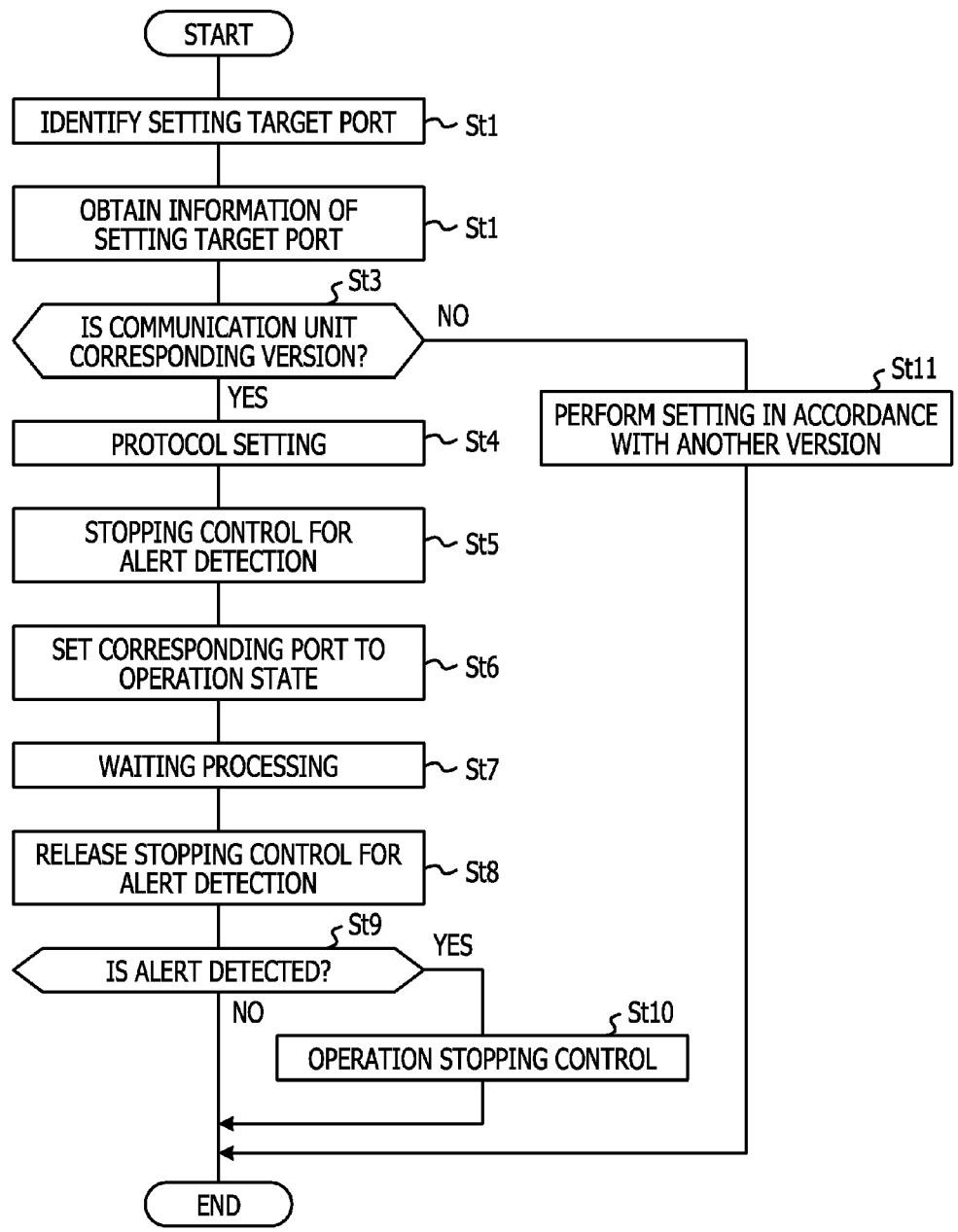
FIG. 11 is a flow chart of setting processing of a transmission apparatus performed at a start of operation.

FIG. 11 is a flow chart of setting processing of the transmission apparatuses 92 performed at a start of operation. The network management apparatus 90 identifies a setting target port P (see FIG. 1) to the transmission apparatus 92 of the transmission side and the transmission apparatus 92 of the reception side (Step St1). The port P is identified by, for example, a port number, which is given to each port P.

Next, the network management apparatus 90 obtains information of the setting target port P (Step St2). Next, the network management apparatus 90 determines, based on the obtained information, whether or not the communication unit 921 of the setting target port P is a version (which will be hereinafter referred to as "the corresponding version") having the configurations illustrated in FIG. 8 and FIG. 10 (Step St3).

If the communication unit 921 is not the corresponding version (NO in Step St3), the network management apparatus 90 performs setting in accordance with another version (Step St11) and ends processing. On the other hand, if the communication unit 921 is the corresponding version (YES in Step St3), the network management apparatus 90 performs protocol setting on the communication unit 921 (Step St4). Each of the processors 10 and 20 of the communication units 921 determines the type information (see FIG. 9) of the above-described SFD code in accordance with the protocol setting. Note that the protocol setting is common between the communication unit 921 of the transmission side and the communication unit 921 of the reception side.

Next, the network management apparatus 90 performs stopping control for alert detection on the communication unit 921 of the reception side (Step St5). The time used for setting performed by the network management apparatus 90 is different between the communication unit 921 of the transmission side and the communication unit 921 of the reception side. If the communication unit 921 receives an Ethernet frame in a state where only setting for the communication unit 921 of the transmission side is completed, for example, an alert for an FCS error is detected, because of difference in setting for the SFD code. Therefore, stopping control for alert detection, that is, so-called mask processing, is performed in the above-described manner, so that undesired alert detection is not performed, thus allowing stable network operation. Note that the time period during which alert detection is stopped is arbitrarily set.

Next, the network management apparatus 90 sets the corresponding port to an operation state (Step St6). Thus, the Ethernet frame is conducted between the communication unit 921 of the transmission side and the communication unit 921 of the reception side.

Next, the network management apparatus 90 performs waiting processing during the time period which has been set (Step St7). Thus, alert detection is stopped during the time period.

Next, the network management apparatus 90 releases stopping control for alert detection (Step St8). Next, the network management apparatus 90 determines whether or not an alert is detected (Step St9).

If an alert is not detected (NO in Step St9), the network management apparatus 90 ends processing. On the other hand, if an alert is detected (YES in Step St9), the network management apparatus 90 performs operation stopping control (Step St10).

As an example in which an alert is detected, there is a case in which a wrong optical fiber is coupled to the communication unit 921 of the reception side. That is, when the communication unit 921 of the transmission side which does not include the configuration illustrated in FIG. 8 is coupled to the communication unit 921 of the reception side, for example, an FCS error alert is detected because SFD codes are different. Note that the Ethernet frame for which an FCS error is detected is discarded in the communication unit 921 and thus is not transmitted to the switch unit 922 and the transmission line.

The above-described embodiment is applied to communication protocols of, for example, STP, Ethernet linear protection (ITU-T recommendation G.8031), and service OAM (IEEE 802.1ag, ITU-T recommendation Y.1731).

STP is a communication protocol used for forming a transmission line such that a loop structure is not generated, and is defined in IEEE 802.1D. In STP, BPDU is exchanged between bridges of nodes, thereby determining a bridge corresponding to the root of a tree structure, that is, a root bridge, and furthermore, blocking an undesired path in accordance with a virtual distance from another bridge to the route bridge.

When the above-described embodiment is applied to STP, as the above-described control frame, an Ethernet frame including BPDU is used. In this embodiment, of BPDU, only a Configuration BPDU section and a TCN BPDU section which are actually used for control processing are added as control information to data of the user frame and are in-band transmitted, and therefore, BPDU is efficiently transmitted. Thus, as will be described later, the convergence time of topology change of a network in STP is reduced.

Ethernet linear protection is a communication protocol used for switching a protection path in Ethernet. When the above-described embodiment is applied to the Ethernet linear protection, an Ethernet frame including CCM or APS is used as the above-described control frame. In this case, only information actually used for control processing is transmitted as control information, and thus, the path switching time in a redundant structure is reduced.

Service OAM is a communication protocol related to maintenance operation function, such as link tracing, loop back test, and the like, in Ethernet. When the above-described embodiment is applied to service OAM, for example, an Ethernet frame including, for example, a maintenance communication channel (MCC) is used as the above-described control frame. In this case, only information actually used for control processing is transmitted as control information, and thus, incorporation of a maintenance signal and the individual function of a vender is simplified.

Advantages of application of this embodiment to STP will be more specifically described below. FIGS. 12A, 12B, and 12C illustrate examples of the control frame used in STP.

FIG. 12A illustrates the structure of a BPDU frame serving as a control frame. The BPDU frame includes DA, SA, TYPE/LENGTH, LLC Header, BPDU, Padding Data, and FCS.

DA is a fixed value (01-0-C1-00-00-00 (h)), and SA is a MAC address serving as a transmission source. TYPE/LENGTH differs in accordance with the content of BPDU, is 0x0026 when BPDU is Configuration BPDU, is 0x0007 when BPDU is TCN BPDU. LLC Header is 0x424203.

BPDU is Configuration BPDU illustrated in FIG. 12B or TCN BPDU illustrated in FIG. 12C. Padding Data is a fixed pattern provided to cause the length of a BPDU frame to be 64 bytes. The length of Padding Data differs in accordance with the content of BPDU, is 8 bytes when BPDU is Configuration BPDU, and is 39 bytes when BPDU is TCN BPDU (4 bytes). FCS is an error correction code used for correct a data error.

FIG. 12B illustrates the structure of Configuration BPDU. Configuration BPDU is data inserted in the location denoted by the reference numeral 7 of FIG. 12A, is used for constructing and monitoring a network topology, and includes Protocol ID, Version, Message Type, Flags, Route ID, Path Cost, Bridge ID, Port ID, Message Age, Max Age, Hello Time, and Forward Delay.

Protocol ID, Version, and Message Type are fixed values, and are 0x0000, 0x00, and 0x00, respectively. As for Flags, the least significant bit indicates a Topology Change (TC) flag and the most significant bit indicates a Topology Change Acknowledgement (TCA) flag.

Route ID indicates Bridge ID of a root bridge and Path Cost is a cost used to reach a route bridge. Bridge ID is a BPDU transmission bridge ID and Port ID is the port ID of a BPDU transmission bridge. Message Age is an elapsed time since the generation of BPDU by the route bridge. Max Age is the maximum time during which the route bridge is held until the route bridge is considered usable.

Hello Time is a time interval up to the time when next BPDU is transmitted from a route bridge. Forward Delay is the time during which a port stays in a listening state (Listening) and a learning state (Learning). In this case, the listening state is the state of the port immediately after linkup and, in this state, only transmission and reception of BPDU is performed without performing transmission and reception of the user frame. Thus, whether or not a loop has been formed in the network is confirmed. Also, the learning state is a state in which the port performs MAC address learning in order to transmit the Ethernet frame in a correct manner.

FIG. 12C illustrates the structure of TCN BPDU. TCN BPDU is data inserted in the location denoted by the reference numeral 7 of FIG. 12A, a non-root bridge is transmitted when a topology change is detected, and TCN BPDU includes Protocol ID, Version, and Message Type. Protocol ID, Version, Message Type are fixed values, and are 0x0000, 0x00, and 0x80, respectively.

Figure 13:
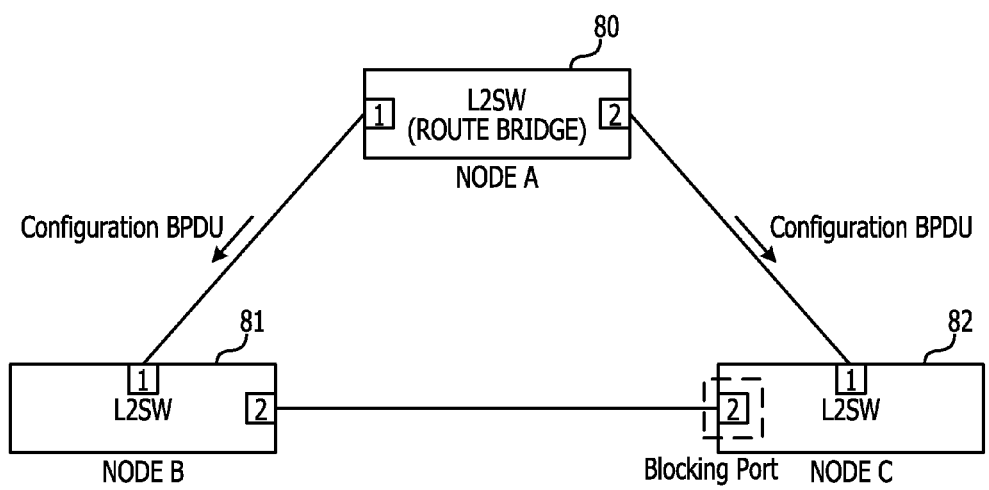
FIG. 13 is a configuration diagram illustrating an example network configuration of a layer 2 switch.

FIG. 13 is a configuration diagram illustrating an example network configuration of a layer 2 switch. The network includes nodes A-C, and layer 2 switches (L2SW) 80-82, which are transmission apparatuses 92, are provided to the nodes A-C, respectively. Each of the layer 2 switches 80-82 includes two ports (see "1" and "2").

In the network of this example, assume that the layer 2 switch 80 of the node A has the smallest bridge ID and is a route bridge (see "ROOT BRIDGE"). The second port ("2") of the layer 2 switch 82 at the node C is coupled to the second port ("2") of the layer 2 switch 81 at the node B and functions as a blocking port (see the dashed line). Each of the layer 2 switches 80-82 exchanges Configuration BPDU, and thereby, the route bridge and the blocking port are determined.

After a topology is constructed in the above-described manner, the layer 2 switch 80 transmits Configuration BPDU to the other layer 2 switches 81 and 82 at the time interval defined by Hello Time in order to monitor the topology. This Hello Time is normally 2 seconds.

Figure 14:
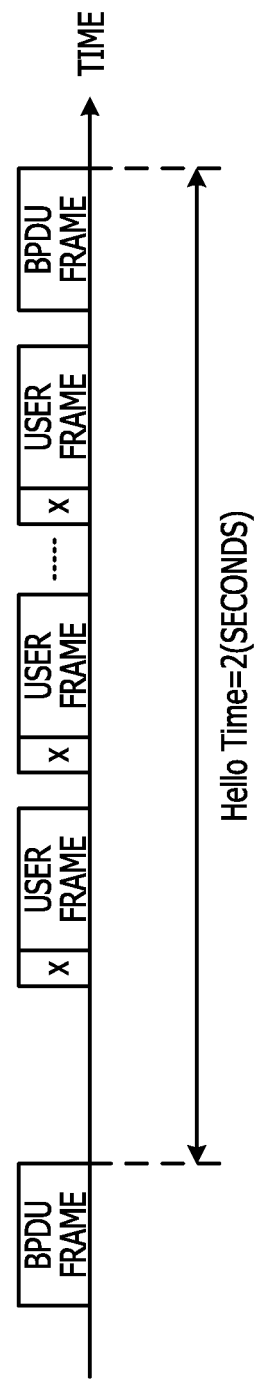
FIG. 14 is a time chart illustrating the transmission interval of a control frame in STP.

FIG. 14 is a time chart illustrating the transmission interval of a control frame in STP. More specifically, FIG. 14 illustrates the transmission interval of a BPDU frame of Configuration BPDU. As described above, when Hello Time is 2 seconds, the BPDU frame is received 2 seconds after being transmitted.

FIG. 14 also illustrates a plurality of user frames including the control information x of Configuration BPDU. The control information x in each user frame includes a part of Configuration BPDU. The data size of the BPDU frame is 64 bytes, whereas the total data size of the control information x is 35 bytes (see FIGS. 12A, 12B, and 12C). Thus, the data size that is to be transmitted is compressed to 54% (=35/64×100).

An example of calculation of transmission time used when Configuration BPDU is accommodated in the control information x of the user frame and thus is transmitted will be described below. In this example, the transmission speed is 1.25 Gbps, that is, GbE, and the length of the user frame is 1518 bytes. An excess of the transmission processing amount=2 bytes is added, so that the length of the user frame as a whole is 1520 bytes. Note that the reason why the length of the user frame is 1518 bytes is that, because of recent increase in use of jumbo frame, for example, for broadcasting information, data is fragmented by 1518 bytes in an increasing number of cases.

Based on the above-described precondition, the transmission time for transmission of 1 byte is 8 nsec, and therefore, the transmission time for transmission of 1520 bytes is 1520 (bytes)×8 (nsec)=12.16 (μsec). Eighteen user frames are used to transmit 35 bytes of Configuration BPDU in the form of control information x of 2 bytes and the transmission time therefore is 12.16 (μsec)×18 (user frames)=218.88 (μsec).

In this case, if the band of the user frame occupies 30% of the entire band, the transmission time when Configuration BPDU is accommodated in the control information x of the user frame and thus is transmitted is 218.88 (μsec)/30(%)=729.6 (μsec).

As described above, when the control information x of the user frame is used, Configuration BPDU can be transmitted in a shorter time period, for example, a time period of micro order, than when Configuration BPDU is accommodated in a BPDU frame and is thus transmitted. Therefore, in STP, the speed of detection of a cause for topology change is increased, and reconvergence time after topology change is reduced.

FIGS. 15A and 15B are tables illustrating parameters and the amount of time used for topology change of STP. More specifically, FIG. 15A illustrates default values and ranges of parameters (MAX Age and Forward Delay) defined in IEEE 802.3-1998, and FIG. 15B illustrates the amount of time used for state transitions of two patterns at the time of topology change.

Using the default values, when a transition from a listening state (Listening) to a forwarding state (Forwarding) via a learning state (Learning) takes place, the time which it takes for the transition to take place is Forward Delay 15 seconds×2=30 seconds. As another example, when a transition from a blocking state (Blocking) to a forwarding state via a listening state and a learning state takes place, the time which it takes for the transition is Max Age (20 seconds)+Forward Delay (15 seconds)×2=50 (seconds).

On the other hand, as described above, when Configuration BPDU is accommodated in the control information x of the user frame and is thus transmitted, each of the parameters can be set to a lower value than the minimum value of the range illustrated in FIG. 15A. With use of the default values, when a transition from a listening state to a forwarding state via a learning state takes place, the time which it takes for the transition to take place is Forward Delay (4 seconds)×2=8 (seconds). As another example, when a transition from a blocking state to a forwarding state via a listening state and a learning state, the time which it takes for the transition to take place is Max Age (6 seconds)+Forward Delay (4 seconds)×2=14 (seconds). Furthermore, the time which it takes for BPDU to reach is taken into consideration, and then, setting to values which are even smaller than the minimum values of IEEE 802.1D-1998 clause 8, 9 Table 8.3 illustrated in FIG. 15A and FIG. 15B, that is, for example, values of msec order.

As described above, this embodiment is applied to STP, so that the time used for topology change is reduced.

As has been described above, a transmission apparatus 92 according to the embodiment includes a transmission processing section (a PHY/MAC section) 16, an excess detection section 141, and an addition processing section (a MUX section) 142. The transmission processing section 16 transmission-processes data accommodated in a variable length Ethernet frame in parallel in a unit of a predetermined amount. The excess detection section 141 detects an excess of the transmission processing amount generated when the length of the Ethernet frame is not an integral multiple of the predetermined amount. The addition processing section 142 adds control information used for control processing with the other transmission apparatus 92 to data in accordance with the excess detected by the excess detection section 141.

The transmission processing unit 16 transmission-processes data accommodated in a variable length Ethernet frame in parallel in a unit of the predetermined amount. Thus, when the length of the Ethernet frame is not an integral multiple of the predetermined amount, an excess of the transmission processing amount is generated.

The addition processing section 142 adds control information used for control processing with the transmission apparatus 92 to data in accordance with the excess detected by the excess detection section 141. Thus, according to this embodiment, a free band corresponding to the excess is effectively used, and thereby, the control information can be effectively transmitted.

A transmission system according to the embodiment includes a first transmission apparatus 92 that transmits a variable length Ethernet frame and a second transmission apparatus 92 that receives the Ethernet frame. The first transmission apparatus 92 includes a transmission processing section (a PHY/MAC section) 16, an excess detection section 141, and an addition processing section (a MUX section) 142. The transmission processing section 16 transmission-processes data accommodated in a variable length Ethernet frame in parallel in a unit of a predetermined amount. The excess detection section 141 detects an excess of the transmission processing amount generated when the length of the Ethernet frame is not an integral multiple of the predetermined amount. The addition processing section 142 adds control information used for control processing with the other transmission apparatus 92 to data in accordance with the excess detected by the excess detection section 141. The second transmission apparatus 92 includes an information obtaining section (a DMUX section) 243 that obtains control information from the Ethernet frame.

The transmission system according to the embodiment includes the configuration of the above-described transmission apparatus 92, and thus, has similar advantages to those described above.

In a transmission method according to the embodiment, data accommodated in a variable length Ethernet frame is transmission-processed in parallel in a unit of a predetermined amount, and control information used for control processing between transmission apparatuses 92 to data in accordance with an excess of the transmission processing amount generated when the length of the Ethernet frame is not an integral multiple.

The transmission method according to the embodiment includes the above-described configuration of the transmission apparatus 92, and thus, has similar advantages to those described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. A transmission system comprising:
  a first transmission apparatus; and
  a second transmission apparatus,
  the first transmission apparatus including:
    a first memory, and
    a first processor coupled to the first memory and configured to:
      extract first control information from a control information frame used in communication processing with the second transmission apparatus, the first control information having a first data amount that is a difference between a data capacity of a first frame including first data and a data amount of the first data,
      add the first control information into the first frame,
      transmit the first frame including the first control information to the second transmission apparatus, extract second control information from the control information frame, the second control information having a second data amount that is a difference between a data capacity of a second frame including a second data and a data amount of the second data, add the second control information into the second frame, and transmit the second frame including the second control information to the second transmission apparatus, the second transmission apparatus including:

a second memory, and a second processor coupled to the second memory and configured to:

receive the first frame and the second frame, extract the first control information and the second control information from the received first frame and the received second frame, detect whether a total value of the first data amount of the first control information and the second data amount of the second control information reaches a data size of the control information frame, and when the total value of the first data amount and the second data amount reaches the data size of the control information frame, execute a process based on the first control information and the second control information.

2. The transmission system according to claim 1, wherein the first data amount is obtained by dividing the data amount of the first data by a predetermined data amount to calculate an excess amount and deducting the calculated excess amount from the predetermined data amount, and the data capacity of the first frame is an integral multiple of the predetermined data amount.

3. The transmission system according to claim 2, wherein the first processor is configured to divide control information in the control information frame into a plurality of sub-frames each of which has the predetermined data amount, and transmit the plurality of sub-frames to the second transmission apparatus.

4. The transmission system according to claim 1, wherein the first control information and the second control information are communication protocol information.

5. The transmission system according to claim 1, wherein the first processor is configured to generate information indicating the first control information data amount to be included in the first frame and transmit the first frame to the second transmission apparatus.

6. The transmission system according to claim 5, wherein the second processor is configured to extract, based on the information indicating the first data amount, the first control information from the received first frame.

7. The transmission system according to claim 1, wherein the first processor is configured to generate information indicating the type of the first control information to be included in the first frame and transmit the first frame to the second transmission apparatus.

8. The transmission system according to claim 1, wherein the first processor is configured to generate an error correction code of the first frame including the first control information.

9. A transmission method using a first transmission apparatus and a second transmission apparatus, the method comprising:

extracting, by the first transmission apparatus, first control information from a control information frame used in communication processing with the second transmission apparatus, the first control information having a first data amount that is a difference between a data capacity of a first frame including first data and a data amount of the first data;

adding, by the first transmission apparatus, the first control information into the first frame;

transmitting, by the first transmission apparatus, the first frame including the first control information to the second transmission apparatus;

extracting, by the first transmission apparatus, second control information from the control information frame, the second control information having a second data amount that is a difference between a data capacity of a second frame including a second data and a data amount of the second data;

adding, by the first transmission apparatus, the second control information into the second frame;

transmitting, by the first transmission apparatus, the second frame including the second control information to the second transmission apparatus;

receiving, by the second transmission apparatus, the first frame and the second frame;

extracting, by the second transmission apparatus, the first control information and the second control information from the received first frame and the received second frame;

detecting, by the second transmission apparatus, whether a total value of the first data amount of the first control information and the second data amount of the second control information reaches a data size of the control information frame; and when the total value of the first data amount and the second data amount reaches the data size of the control information frame, executing, by the second transmission apparatus, a process based on the first control information and the second control information.

10. The transmission method according to claim 9, wherein the first data amount is obtained by dividing the data amount of the first data by a predetermined data amount to calculate an excess amount and deducting the calculated excess amount from the predetermined data amount, and the data capacity of the first frame is an integral multiple of the predetermined data amount.

11. The transmission method according to claim 9, further comprising:

dividing, by the first transmission apparatus, the first frame into a plurality of sub-frames each of which has the predetermined data amount; and transmitting, by the first transmission apparatus, the plurality of sub-frames to the second transmission apparatus.

12. The transmission method according to claim 9, further comprising:
    generating, by the first transmission apparatus, information indicating the first data amount to be included in the first frame;
    transmitting the frame including the information indicating the first data amount from the first transmission apparatus to the second transmission apparatus; and
    separating, by the second transmission apparatus, based on the information indicating the first data amount, the first control information and the first data.

* * * * *